(12) United States Patent
Carnevali et al.

(10) Patent No.: US 12,044,401 B2
(45) Date of Patent: Jul. 23, 2024

(54) METHOD FOR CONTROLLING A STEAM GENERATING SYSTEM FOR A DOMESTIC STEAM COOKING OVEN AND STEAM GENERATING SYSTEM

(71) Applicant: ELECTROLUX APPLIANCES AKTIEBOLAG, Stockholm (SE)

(72) Inventors: Marco Carnevali, Forlì (IT); Alberto Dell'Olio, Forlì (IT); Massimo Banzato, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 529 days.

(21) Appl. No.: 17/413,341

(22) PCT Filed: Dec. 6, 2019

(86) PCT No.: PCT/EP2019/084021
§ 371 (c)(1),
(2) Date: Jun. 11, 2021

(87) PCT Pub. No.: WO2020/120324
PCT Pub. Date: Jun. 18, 2020

(65) Prior Publication Data
US 2022/0018532 A1    Jan. 20, 2022

(30) Foreign Application Priority Data
Dec. 12, 2018 (EP) ..................................... 18212063

(51) Int. Cl.
*A47J 27/04* (2006.01)
*A21B 3/04* (2006.01)
(Continued)

(52) U.S. Cl.
CPC ................ *F22B 37/60* (2013.01); *A21B 3/04* (2013.01); *A23L 5/13* (2016.08); *A47J 27/04* (2013.01);
(Continued)

(58) Field of Classification Search
CPC . F22B 37/60; F22B 37/47; A23L 5/13; A21B 3/04; A47J 27/07; A47J 2027/043; F22D 5/24; F22D 5/34; F24C 15/003
(Continued)

(56) References Cited

U.S. PATENT DOCUMENTS

| 4,891,498 A | 1/1990 | Fortmann et al. |
| 4,939,987 A | 7/1990 | Smith |

(Continued)

FOREIGN PATENT DOCUMENTS

EP    1658798    5/2006

OTHER PUBLICATIONS

International Search Report and Written Opinion for PCT/EP2019/084021, dated Jan. 20, 2020, 9 pages.

*Primary Examiner* — Avinash A Savani
(74) *Attorney, Agent, or Firm* — Pearne & Gordon LLP (57) ABSTRACT

The present invention relates to a method for controlling a steam generating system (10) for a domestic steam cooking oven (40). A steam generator (26) and an inlet valve (16) are controlled by a regulating thermal switch (30) and a limiting thermal switch (32). The regulating thermal switch (30) and the limiting thermal switch (32) respond to a temperature within and/or at the steam generator (26). A threshold value of the limiting thermal switch (32) is higher than a threshold value (Ts) of the regulating thermal switch (30). The steam generator (26) is deactivated and the inlet valve (16) is activated by the regulating thermal switch (30), if the
(Continued)

temperature (T) of the steam generator (26) exceeds the threshold value (Ts) of the regulating thermal switch (30).

18 Claims, 5 Drawing Sheets

(51) Int. Cl.
  *A23L 5/10* (2016.01)
  *F22B 37/47* (2006.01)
  *F22B 37/60* (2006.01)
  *F22D 5/24* (2006.01)
  *F22D 5/34* (2006.01)
  *F24C 15/00* (2006.01)

(52) U.S. Cl.
  CPC ................ *F22B 37/47* (2013.01); *F22D 5/24* (2013.01); *F22D 5/34* (2013.01); *F24C 15/003* (2013.01); *A47J 2027/043* (2013.01)

(58) Field of Classification Search
  USPC .......................................................... 126/20
  See application file for complete search history.

(56) References Cited

U.S. PATENT DOCUMENTS

| | | | | |
|---|---|---|---|---|
| 2008/0292761 A1* | 11/2008 | Baratin | ................... | A47J 27/04 99/330 |
| 2009/0107477 A1* | 4/2009 | Frock | ....................... | A21B 3/04 126/20.2 |
| 2015/0173551 A1* | 6/2015 | Carbone | ............... | F24C 15/164 700/282 |

* cited by examiner

METHOD FOR CONTROLLING A STEAM GENERATING SYSTEM FOR A DOMESTIC STEAM COOKING OVEN AND STEAM GENERATING SYSTEM

The present invention relates to a method for controlling a steam generating system for a domestic steam cooking oven. Further, the present invention relates to a steam generating system for a domestic steam cooking oven. Moreover, the present invention relates to a domestic steam cooking oven.

Steam cooking becomes more important, since the steam process provides great tasting food and preserves the nutrients naturally present in the food. More and more domestic cooking ovens comprise steam cooking functions. For example, a steam generating system is arranged outside the oven cavity, wherein the steam will be injected into said oven cavity by one or more nozzles.

Figure 3:
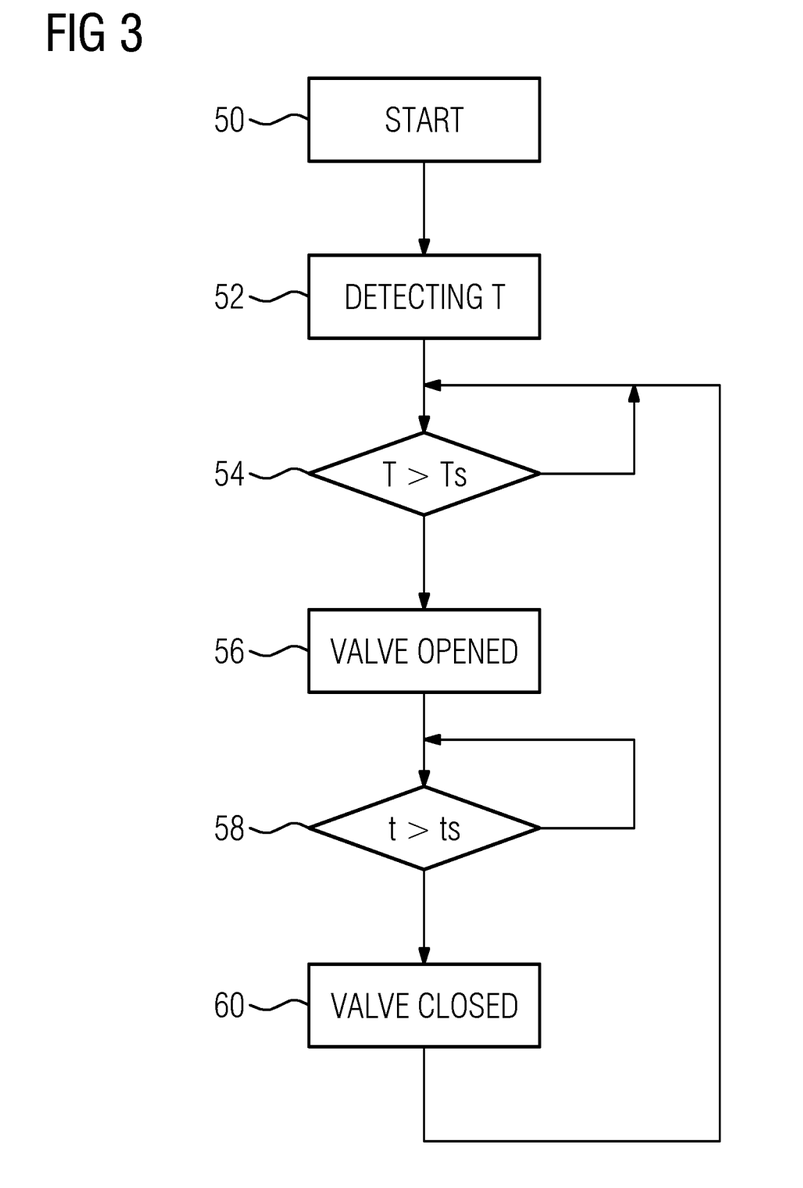
FIG. 3 illustrates a schematic flow chart diagram of the method for controlling the steam generating system of the domestic cooking oven according to the prior art.

FIG. 3 illustrates a schematic flow chart diagram of a method for controlling a steam generating system of a domestic steam cooking oven according to the prior art. In a first step 50 the method is started. A steam generator is activated at the same time or has been activated before. In a next step 52 the temperature T within the steam generator is detected. For example, the temperature T is detected by a negative temperature coefficient (NTC) resistor. In a step 54 it is checked, if the detected temperature T is higher than a set threshold temperature value Ts. If the detected temperature T is lower than the set threshold temperature value Ts, then the method returns to step 54 again. If the detected temperature T is higher than the set threshold temperature value Ts, then an inlet valve is opened in a step 56. A time warp is performed in a step 58, so that the inlet valve is opened for a predetermined time ts. In a step 60 the inlet valve is closed. After that, the method returns to step 54 again.

In the prior art, the inlet valve 16 is turned on for a fixed time ts. If the steam generator 26 is not cooled down, the inlet valve 16 will be turned on again for said fixed time ts. When there is lack of water in the steam generator 26, said steam generator 26 remains activated and temperature peaks occur. Since the quantity of water is minimal, this results in loss of energy. The system of the prior art requires a digital control unit and a continuous control of the temperature.

It is an object of the present invention to provide a method for controlling a steam generating system for a domestic cooking oven, which avoids temperature peaks by low complexity.

The object of the present invention is achieved by the method according to claim 1.

According to the present invention a method for controlling a steam generating system for a domestic steam cooking oven, wherein:
- a steam generator and an inlet valve are controlled by a regulating thermal switch and a limiting thermal switch,
- the regulating thermal switch and the limiting thermal switch respond to a temperature within and/or at the steam generator,
- a threshold value of the limiting thermal switch is higher than a threshold value of the regulating thermal switch, and
- the steam generator is deactivated and the inlet valve is activated by the regulating thermal switch, if the temperature of the steam generator exceeds the threshold value of said regulating thermal switch.

The core of the present invention is that the regulating thermal switch activates alternatingly the steam generator and an inlet valve on the one hand and that the regulating thermal switch and the limiting thermal switch have different threshold values on the other hand. This combination does not require any electronic control circuit, but electromechanical elements only. The method of the present invention avoids high temperature peaks in the steam generator, since said steam generator is deactivated, if there is lack of water. This contributes to energy saving. The combination of the regulating thermal switch and the limiting thermal switch allow a more accurate control of the steam generator. The inlet valve is activated just for a time interval required for cooling down the steam generator and its environment, so that energy is saved.

Preferably, a water supply of the steam generator is activated and deactivated by the inlet valve.

Particularly, the water supply of the steam generator is performed by gravity from a water reservoir arranged above the steam generator and the inlet valve.

Further, the steam generator and the inlet valve may be deactivated by the limiting thermal switch, if the temperature of the steam generator exceeds the threshold value of said limiting thermal switch.

Moreover, the simultaneous activation of the steam generator and opening of the inlet valve is always excluded. It is only allowed that the steam generator is deactivated and the inlet valve is opened, that the steam generator is activated and the inlet valve is closed, and that the steam generator is deactivated and the inlet valve is closed.

For example, the difference between the threshold value of the limiting thermal switch and the threshold value of the regulating thermal switch is between 40° C. and 80° C., preferably 60° C.

The threshold value of the limiting thermal switch may be between 220° C. and 270° C., preferably 245° C.

The threshold value of the regulating thermal switch may be between 160° C. and 210° C., preferably 185° C.

In particular, the steam is generated within the steam generator and delivered to an oven cavity of the steam cooking oven via a steam nozzle, so that the steam is generated out of said oven cavity. Thus, the evaporation is performed inside said steam generator.

Further, the present invention relates to a steam generating system for a domestic steam cooking oven, wherein said steam generating system comprises:
- a steam generator,
- an inlet valve for activating and deactivating the water supply for the steam generator,
- a regulating thermal switch for controlling the steam generator and inlet valve, and
- a limiting thermal switch for controlling the steam generator and inlet valve, wherein
- the regulating thermal switch and the limiting thermal switch respond to a temperature within and/or at the steam generator,
- a threshold value of the limiting thermal switch is higher than a threshold value of the regulating thermal switch, and
- the steam generator is deactivated and the inlet valve is activated by the regulating thermal switch, if the temperature of the steam generator exceeds the threshold value of said regulating thermal switch.

Preferably, the steam generating system comprises a water reservoir arranged above the steam generator and the inlet valve, so that the water supply for the steam generator is driven by gravity.

Particularly, the limiting thermal switch is provided for deactivating the steam generator and the inlet valve, if the temperature of the steam generator exceeds the threshold value of said limiting thermal switch.

For example, the regulating thermal switch is provided as a selector between the steam generator and the inlet valve.

Further, the difference between the threshold value of the limiting thermal switch and the threshold value of the regulating thermal switch may be between 40° C. and 80° C., preferably 60° C.

Moreover, the threshold value of the limiting thermal switch is between 220° C. and 270° C., preferably 245° C., while the threshold value of the regulating thermal switch is between 160° C. and 210° C., preferably 185° C.

In particular, the steam generator is a flow type steam generator. By this way, the evaporation is performed inside said steam generator.

Preferably, the steam generating system comprises a steam nozzle interconnectable or interconnected between the steam generator and an oven cavity of the steam cooking oven, wherein said steam nozzle is provided for delivering the steam from the steam generator to said oven cavity. By this way, the ready-made steam is delivered to the oven cavity of the steam cooking oven. Thus, the steam is generated out of said oven cavity.

At last, the present invention relates to a domestic steam cooking oven provided for the method described above and/or comprising the steam generating system mentioned above.

Novel and inventive features of the present invention are set forth in the appended claims.

The present invention will be described in further detail with reference to the drawings, in which

Figure 1:
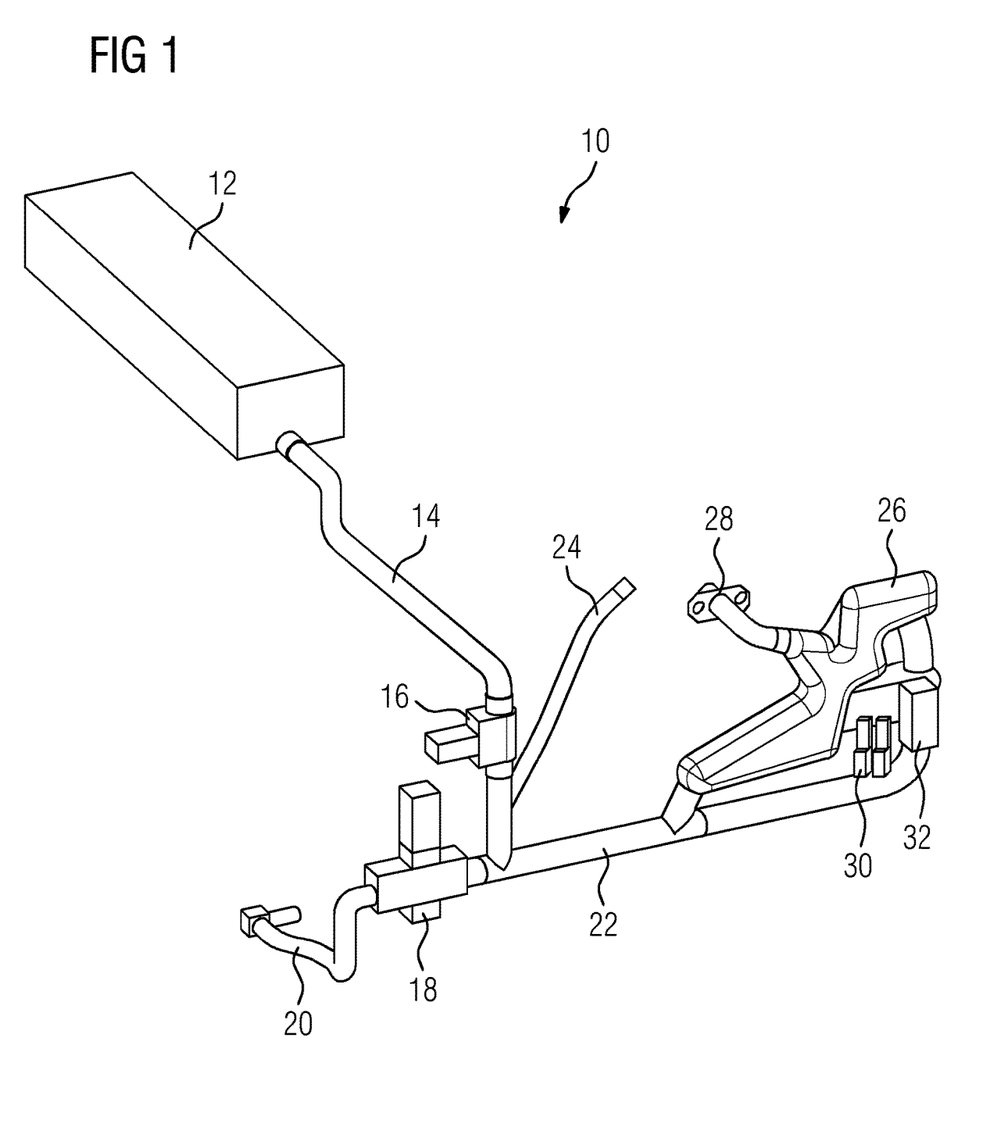
FIG. 1 illustrates a schematic perspective view of a steam generating system for a domestic steam cooking oven according to a preferred embodiment of the present invention.

FIG. 1 illustrates a schematic perspective view of a steam generating system 10 for a domestic steam cooking oven 40 according to a preferred embodiment of the present invention.

The steam generating system 10 comprises a water tank 12, a water loading tube 14, an inlet valve 16, a drain valve 18, a drain tube 20, a water tube 22, an air tube 24, a steam generator 26 and a steam nozzle 28. The steam generator 26 includes a regulating thermal switch 30 and a limiting thermal switch 32.

Said regulating thermal switch 30 and limiting thermal switch 32 may be arranged in the same position or in different positions. The regulating thermal switch 30 and the limiting thermal switch 32 are arranged within and/or at the steam generator 26. For example, the regulating thermal switch 30 and the limiting thermal switch 32 may be formed as a double switch including a common body. The regulating thermal switch 30 and the limiting thermal switch 32 may be arranged side-by-side to each other, wherein said regulating thermal switch 30 and limiting thermal switch 32 pick up temperature around the same spot. Otherwise, a compensation may be required if there is a bigger distance between the regulating thermal switch 30 and the limiting thermal switch 32 or if one of said regulating thermal switch 30 or limiting thermal switch 32 is assembled within a casing made of thinner metal.

The water tank 12 is connected to the intake of the inlet valve 16 via the water loading tube 14. The intake of the drain valve 18 is connectable to a drain of an oven cavity via the drain tube 20. The outlets of the inlet valve 16 and drain valve 18 are connected to the steam generator 26 via the water tube 22. The air tube 24 is interconnectable between the water tube 22 and the oven cavity. The steam generator 26 is connectable to the oven cavity via the steam nozzle 28.

In this example, the steam generator 26 is L-shaped. The steam generator 26 includes an L-shaped tubular heating element made of metal and a plastic part acting as droplet separator. In general, the steam generator 26 may have an arbitrary shape, e.g. squared or rectangular.

In the L-shaped steam generator 26 the regulating thermal switch 30 and the limiting thermal switch 32 are arranged in positions being particularly sensitive to the presence of water within the steam generator 26 itself. If the steam generator 26 is empty, i.e. filled by air or steam, then the heat generated by heating elements embedded in the steam generator 26 is conducted by the metal body of the steam generator 26 and reaches the regulating thermal switch 30 and the limiting thermal switch 32, since the air and steam are worse thermal conductors than metal or liquid water. If the steam generator 26 is completely filled by water, then a lot of heat generated by the heating elements of the steam generator 26 water is absorbed by cold water, so that the heat cannot reach the regulating thermal switch 30 and the limiting thermal switch 32.

The steam generator 26 according to the preferred embodiment of the present invention is a flow type steam generator. The steam generator 26 is closed and connected to the water tube 22 and the steam nozzle 28. The evaporation is performed inside said steam generator 26. The water is delivered to the steam generator 26 via the water tube 22. The steam generated within the steam generator 26 is delivered from said steam generator 26 to the oven cavity via the steam nozzle 28. Thus, the steam is generated out of the oven cavity.

Figure 2:
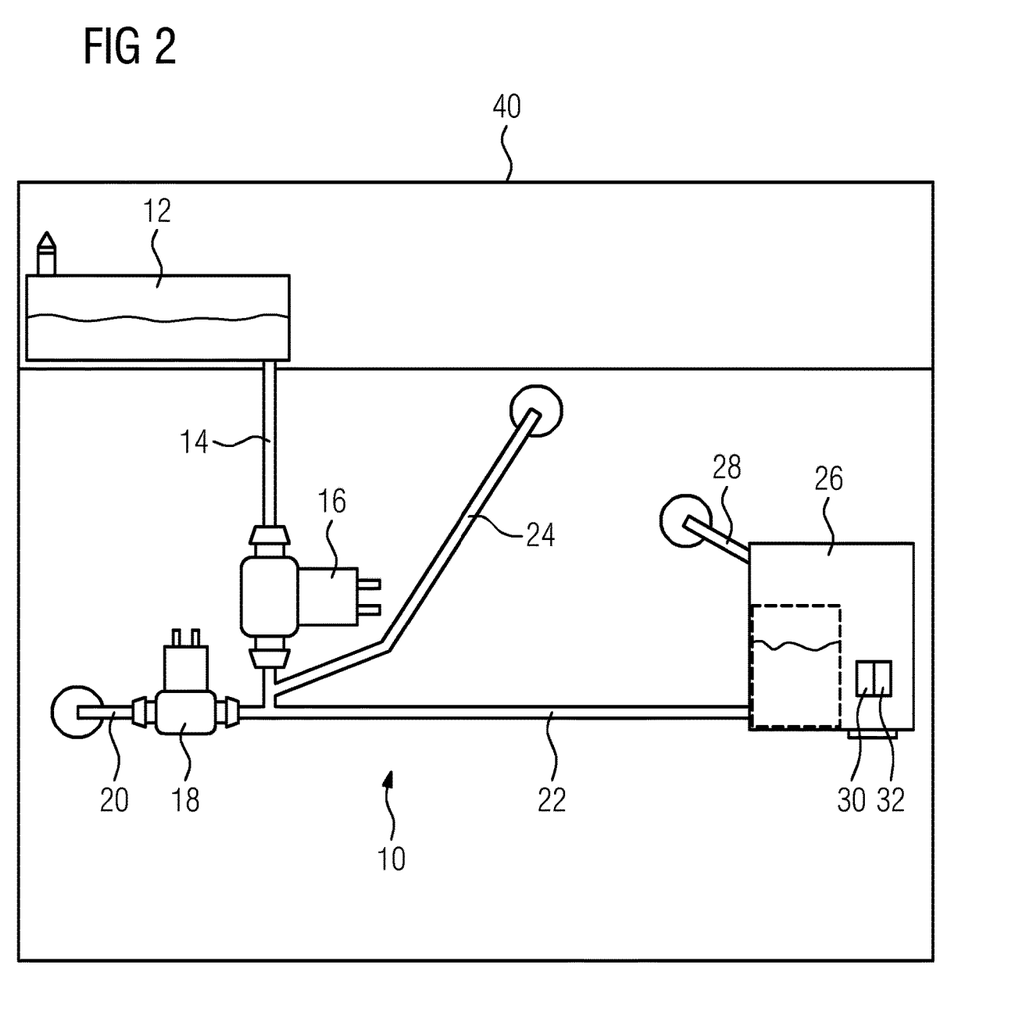
FIG. 2 illustrates a schematic rear view of a steam cooking oven with the steam generating system according to the preferred embodiment of the present invention.

FIG. 2 illustrates a schematic rear view of the steam cooking oven 40 with the steam generating system 10 according to the preferred embodiment of the present invention.

The steam generating system 10 comprises the water tank 12, the water loading tube 14, the inlet valve 16, the drain valve 18, the drain tube 20, the water tube 22, the air tube 24, the steam generator 26 and the steam nozzle 28. The steam generator 26 includes the regulating thermal switch 30 and the limiting thermal switch 32 arranged within and/or at said steam generator 26.

The water tank 12 is connected to the intake of the inlet valve 16 via the water loading tube 14. The intake of the drain valve 18 is connected to the drain of the oven cavity via the drain tube 20. The outlets of the inlet valve 16 and drain valve 18 are connected to the steam generator 26 via the water tube 22. The air tube 24 is interconnected between the water tube 22 and the oven cavity. The steam generator 26 is connected to the oven cavity via the steam nozzle 28.

The water tank 12 is arranged above the inlet valve 16, so that the water is delivered by gravity from the water tank 12 through the water loading tube 14 to the inlet valve 16. The drain valve 18 remains in the closed state, unless a drain or service function is activated.

When the temperature in the steam generator 26 rises above a predefined threshold value, said steam generator 26 is deactivated by the regulating thermal switch 30, wherein the inlet valve 16 is activated, i.e. opened, at the same time. Then, water flows through the water tube 22 into the steam generator 26 and cools it down. When the temperature in the steam generator 26 returns below the threshold value, then the inlet valve 16 is deactivated, i.e. closed, and the steam generator 26 is activated again by the regulating thermal switch 30.

The limiting thermal switch 32 acts as a safety device for the steam generator 26. The threshold value of the limiting thermal switch 32 is higher than the threshold value of the regulating thermal switch 30. For example, in a prototype of the steam generating system 10 according to the present invention the threshold value of the regulating thermal switch 30 is about 185° C., while the threshold value of the limiting thermal switch 32 has is been set on 245° C. However, the threshold values depend on the design of the steam generating system 10 itself. In the prototype of the steam generating system 10 a spot has been chosen, which is very sensitive to the presence of water or not. In general, the temperature difference between the threshold values of the regulating thermal switch 30 and the limiting thermal switch 32 is within a range between 40° C. and 80° C., preferably about 60° C.

The steam generating system 10 is exclusively controlled by electromechanical devices, i.e. the regulating thermal switch 30 and the limiting thermal switch 32.

Additionally, one or more control devices dedicated to service functions like rinsing or descaling of the system may be provided.

FIG. 3 illustrates a schematic flow chart diagram of a method for controlling a steam generating system 10 of a domestic steam cooking oven 40 according to the prior art.

In a first step 50 the method is started. The steam generator 26 is activated at the same time or has been activated before. In a next step 52 the temperature T within the steam generator 26 is detected. For example, the temperature T is detected by a negative temperature coefficient (NTC) resistor.

In a step 54 it is checked, if the detected temperature T is higher than a set threshold temperature value Ts. If the detected temperature T is lower than the set threshold temperature value Ts, then the method returns to step 54 again. If the detected temperature T is higher than the set threshold temperature value Ts, then the inlet valve 16 of the is opened in a step 56.

A time warp is performed in a step 58, so that the inlet valve 16 is opened for a predetermined time ts. In a step 60 the inlet valve 16 is closed. After that, the method returns to step 54 again.

In the prior art, the inlet valve 16 is turned on for a fixed time ts. If the steam generator 26 is not cooled down, the inlet valve 16 will be turned on again for said fixed time ts. When there is lack of water in the steam generator 26, said steam generator 26 remains activated and temperature peaks occur. Since the quantity of water is minimal, this results in loss of energy. The system of the prior art requires a digital control unit and a continuous control of the temperature.

Figure 4:
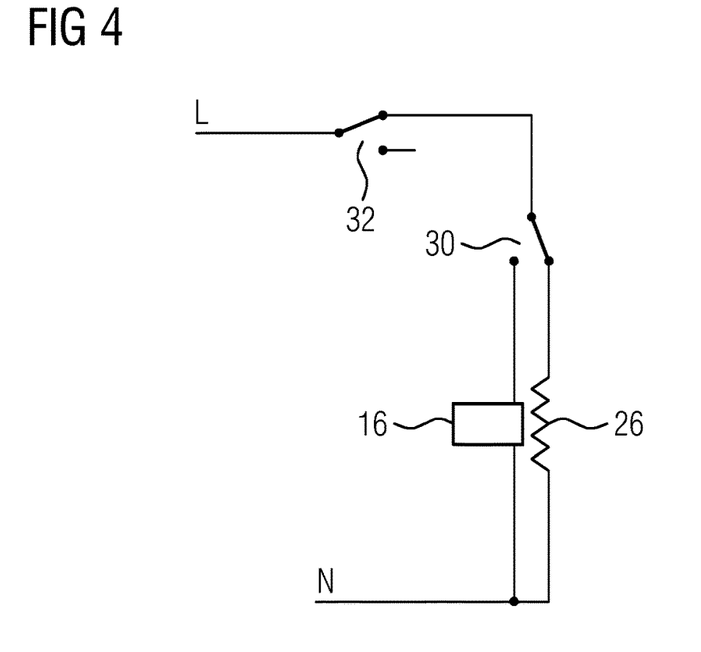
FIG. 4 illustrates a schematic circuit diagram of the steam generating system according to a first embodiment of the present invention.

FIG. 4 illustrates a schematic circuit diagram of the steam generating system 10 according to a first embodiment of the present invention. The circuit comprises the inlet valve 16, the steam generator 26, the regulating thermal switch 30 and the limiting thermal switch 32.

The inlet valve 16 is connected parallel to the steam generator 26. The limiting thermal switch 32, the regulating thermal switch 30 and the parallel inlet valve 16 and steam generator 26 are connected in series, wherein regulating thermal switch 30 acts as a selector between the inlet valve 16 and the steam generator 26. Thus, either the inlet valve 16 or the steam generator 26 is activated. The activated inlet valve 16 means that the inlet valve 16 is open. The limiting thermal switch 32 either deactivates both the inlet valve 16 and the steam generator 26 or actives one of these.

For example, the regulating thermal switch 30 is a single pole double throw (SPDT) switch. Further, the limiting thermal switch 32 may be a single pole single throw (SPST) switch.

Figure 5:
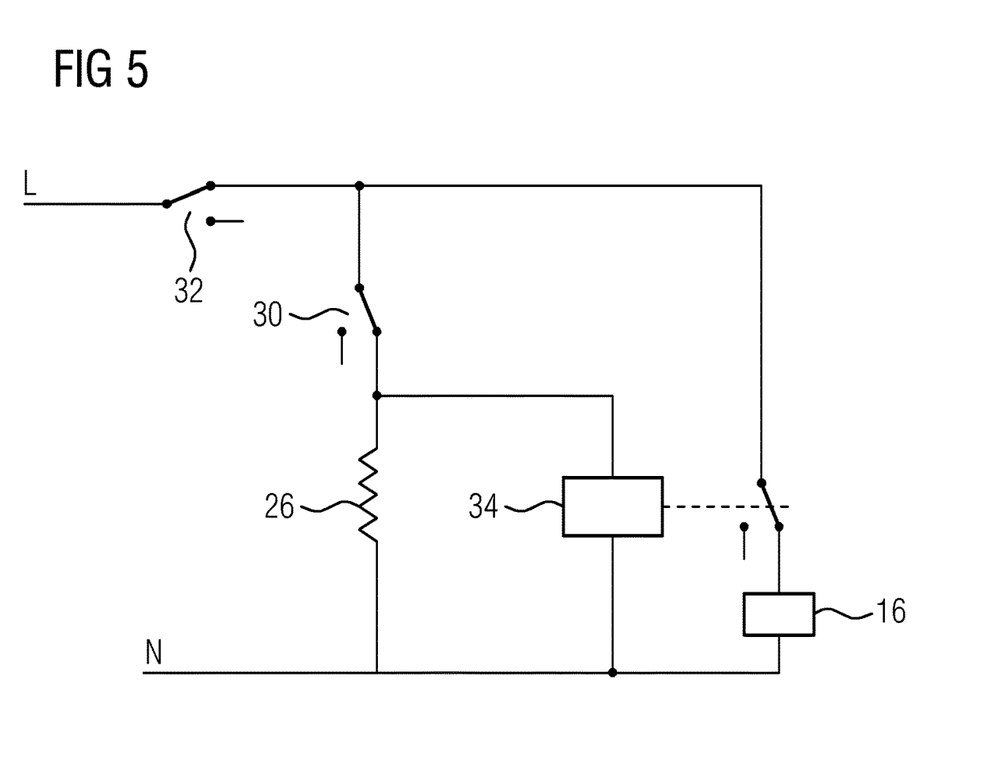
FIG. 5 illustrates a schematic circuit diagram of the steam generating system according to a second embodiment of the present invention.

FIG. 5 illustrates a schematic circuit diagram of the steam generating system 10 according to a second embodiment of the present invention. The circuit comprises the inlet valve 16, the steam generator 26, the regulating thermal switch 30 and the limiting thermal switch 32. Additionally, the circuit includes a relay 34.

The control circuit of the relay 34 is connected parallel to the steam generator 26. The regulating thermal switch 30 and the parallel steam generator 26 and control circuit of the relay 34 are connected in series. Said series is connected parallel to a series of the load circuit of the relay 34 and the inlet valve 16. In turn, this group and the limiting thermal switch 32 are connected in series. The limiting thermal switch 32 deactivates both the inlet valve 16 and the steam generator 26. The regulating thermal switch 30 and the limiting thermal switch 32 may be a thermal cut off (TCO) switch disconnecting the electric contact between two terminals if the temperature of the sensing part of said switch reaches a certain threshold value.

When the temperature at the regulating thermal switch 30 reaches the threshold value, then the power to the steam generator 26 and to the relay 34 is disconnected. When the relay 26 is disconnected from the main power, then the current to the inlet valve 16 is switched on and said inlet valve 16 is opened. Thus, the inlet valve 16 and the steam generator 26 are activated alternatingly. The circuit in FIG. 5 provides the same function as the circuit in FIG. 4.

The method of the present invention avoids high temperature peaks in the steam generator 26, since said steam generator 26 is deactivated, if there is lack of water. This contributes to energy saving. The regulating thermal switch 30 and the limiting thermal switch 32 allow a more accurate control of the steam generator 26. The inlet valve 16 is activated just for a time interval required for cooling down the steam generator 26 and its environment, so that energy is saved.

Figure 6:
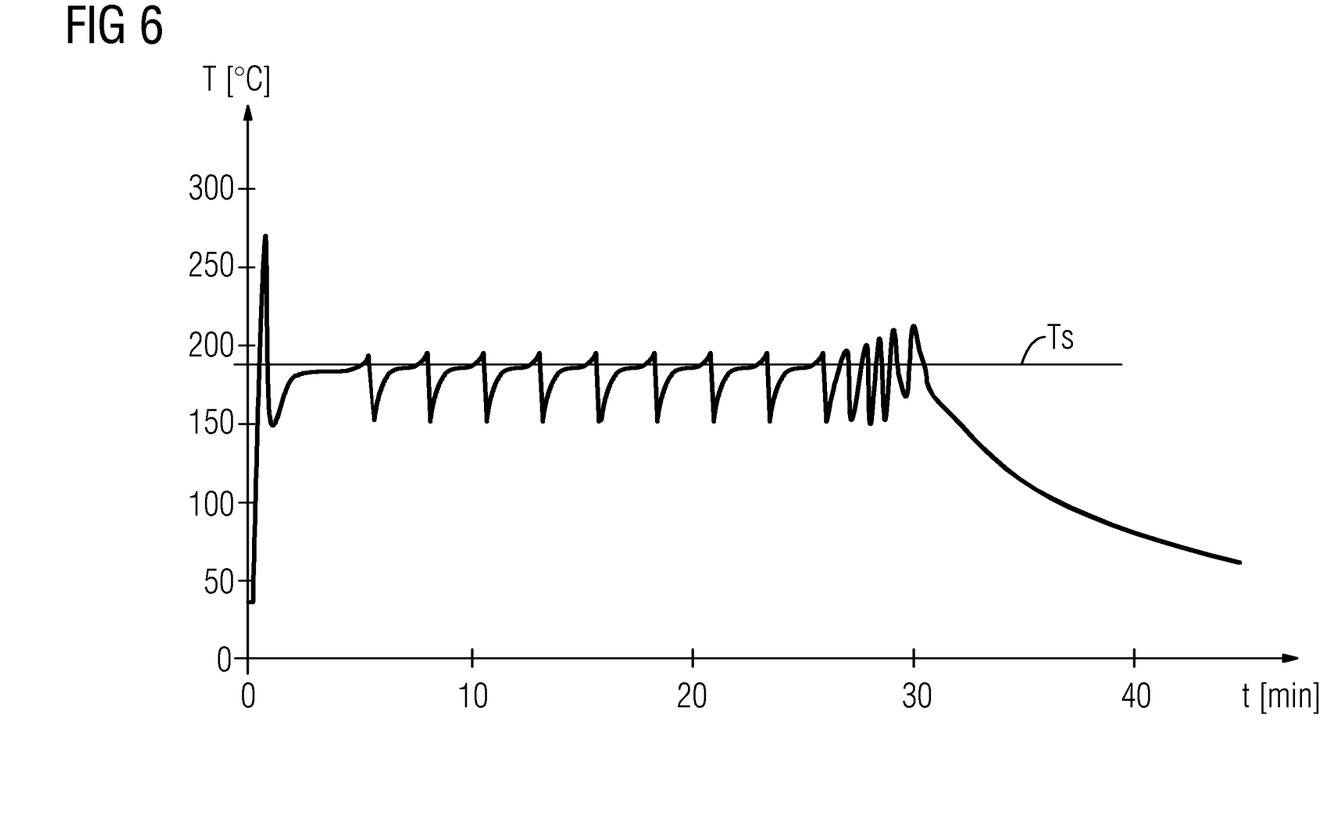
FIG. 6 illustrates a schematic diagram of the temperature as function of the time for the steam generating system according to the preferred embodiment of the present invention.

FIG. 6 illustrates a schematic diagram of the temperature T as function of the time t for the steam generating system 10 according to the preferred embodiment of the present invention.

In this example, the set threshold temperature value Ts of the regulating thermal switch 30 is about 180° C. The inlet valve 16 is opened, if the temperature T exceeds the set threshold temperature value Ts of the regulating thermal switch 30.

The regulating thermal switch 30 and the limiting thermal switch 32 do not require any electronic control circuit. The steam generating system of the present invention allows the gravity driven water supply.

Although an illustrative embodiment of the present invention has been described herein with reference to the accompanying drawings, it is to be understood that the present invention is not limited to that precise embodiment, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

- 10 steam generating system
- 12 water tank
- 14 water loading tube
- 16 inlet valve
- 18 drain valve
- 20 drain tube
- 22 water tube
- 24 air tube
- 26 steam generator
- 28 steam nozzle
- 30 regulating thermal switch
- 32 limiting thermal switch
- 34 relay
- 40 steam cooking oven
- 50 step of starting the method
- 52 step of detecting the temperature
- 54 step of checking the temperature
- 56 step of opened inlet valve
- 58 time warp
- 60 step of closed inlet valve
- T temperature
- Ts set threshold temperature value
- t time
- ts set time for opening the inlet valve

The invention claimed is:

1. A method for controlling a steam generating system for a domestic steam cooking oven, wherein:
   a steam generator and an inlet valve are controlled by a regulating thermal switch and a limiting thermal switch,
   the regulating thermal switch and the limiting thermal switch respond to a temperature within and/or at the steam generator,
   a threshold value of the limiting thermal switch is higher than a threshold value of the regulating thermal switch,
   the steam generator is deactivated and the inlet valve is activated by the regulating thermal switch if the temperature within and/or at the steam generator exceeds the threshold value of said regulating thermal switch, and
   wherein the threshold value of the regulating thermal switch is between 160° C. and 210° C.

2. The method according to claim 1, wherein a water supply of the steam generator is activated and deactivated by the inlet valve.

3. The method according to claim 1, wherein a water supply of the steam generator is provided by gravity from a water reservoir arranged above the steam generator and the inlet valve.

4. The method according to claim 1, wherein the steam generator and the inlet valve are deactivated by the limiting thermal switch if the temperature within and/or at the steam generator exceeds the threshold value of said limiting thermal switch.

5. The method according to claim 1, wherein simultaneous activation of the steam generator and opening of the inlet valve is always excluded.

6. The method according to claim 1, wherein a difference between the threshold value of the limiting thermal switch and the threshold value of the regulating thermal switch is between 40° C. and 80° C.

7. The method according to claim 1, wherein the threshold value of the limiting thermal switch is between 220° C. and 270° C.

8. The method according to claim 1, wherein steam is generated within the steam generator and delivered to an oven cavity of the steam cooking oven via a steam nozzle, so that the steam is generated out of said oven cavity.

9. A steam generating system for a domestic steam cooking oven, wherein said steam generating system comprises:
   a steam generator,
   an inlet valve for activating and deactivating a water supply for the steam generator,
   a regulating thermal switch for controlling the steam generator and inlet valve, and
   a limiting thermal switch for controlling the steam generator and inlet valve, wherein
   the regulating thermal switch and the limiting thermal switch respond to a temperature within and/or at the steam generator,
   a threshold value of the limiting thermal switch being higher than a threshold value of the regulating thermal switch,
   the regulating thermal switch being adapted to deactivate the steam generator and to activate the inlet valve if the temperature within and/or at the steam generator exceeds the threshold value of said regulating thermal switch, and
   wherein the threshold value of the regulating thermal switch is between 160° C. and 210° C.

10. The system according to claim 9, wherein the steam generating system comprises a water reservoir arranged above the steam generator and the inlet valve, so that the water supply for the steam generator is driven by gravity.

11. The system according to claim 9, wherein the limiting thermal switch is adapted to deactivate the steam generator and the inlet valve if the temperature of the steam generator exceeds the threshold value of said limiting thermal switch.

12. The system according to claim 9, wherein the regulating thermal switch is adapted as a selector between the steam generator and the inlet valve.

13. The system according to claim 9, wherein a difference between the threshold value of the limiting thermal switch and the threshold value of the regulating thermal switch is between 40° C. and 80° C.

14. The system according to claim 9, wherein the threshold value of the limiting thermal switch is between 220° C. and 270° C.

15. The system according to claim 9, wherein the steam generator is a flow type steam generator.

16. The system according to claim 9, wherein the steam generating system comprises a steam nozzle interconnectable or interconnected between the steam generator and an oven cavity of the steam cooking oven, wherein said steam nozzle is adapted to deliver steam from the steam generator to said oven cavity.

17. A steam generating system for a domestic steam cooking oven, comprising a cooking cavity, a water tank for holding water, a steam generator, a regulating thermal switch and a limiting thermal switch; said water tank being connected via a normally-closed water-supply valve to said steam generator in order to supply water thereto for generating steam; said steam generator being further connected via a steam nozzle to said cooking cavity in order to supply to said cavity steam generated in said steam generator; said regulating thermal switch and said limiting thermal switch each being an electromechanical switch devoid of electronic control circuits and disposed in intimate thermal communication with said steam generator in order to be influenced by temperature fluctuations of said steam generator; said limiting thermal switch being wired in a power circuit for supplying power to both said steam generator and said water-supply valve; said regulating thermal switch being wired in series with said limiting thermal switch and being adapted to alternately select between powering, via said power circuit, either said steam generator or said water-supply valve depending on a temperature of said regulating thermal switch being above or below a temperature-regulate threshold; said limiting thermal switch being adapted to open said power circuit at a temperature-limit threshold; said regulating thermal switch being adapted to connect said steam generator to said power circuit below said temperature-regulate threshold and to connect said water-supply valve to said power circuit above said temperature-regulate threshold, wherein both said steam generator and said water-supply valve cannot be simultaneously connected to said power circuit; said temperature-limit threshold being 40° C. to 80° C. higher than said temperature-regulate threshold.

18. The steam generating system according claim 17, said regulating thermal switch and said limiting thermal switch both physically contacting the steam generator at substantially the same location, a temperature of said steam generator at said location being sensitive to whether water is present or absent within said steam generator.

* * * * *